TUNING MECHANISM

Filed Oct. 23, 1956 2 Sheets-Sheet 1

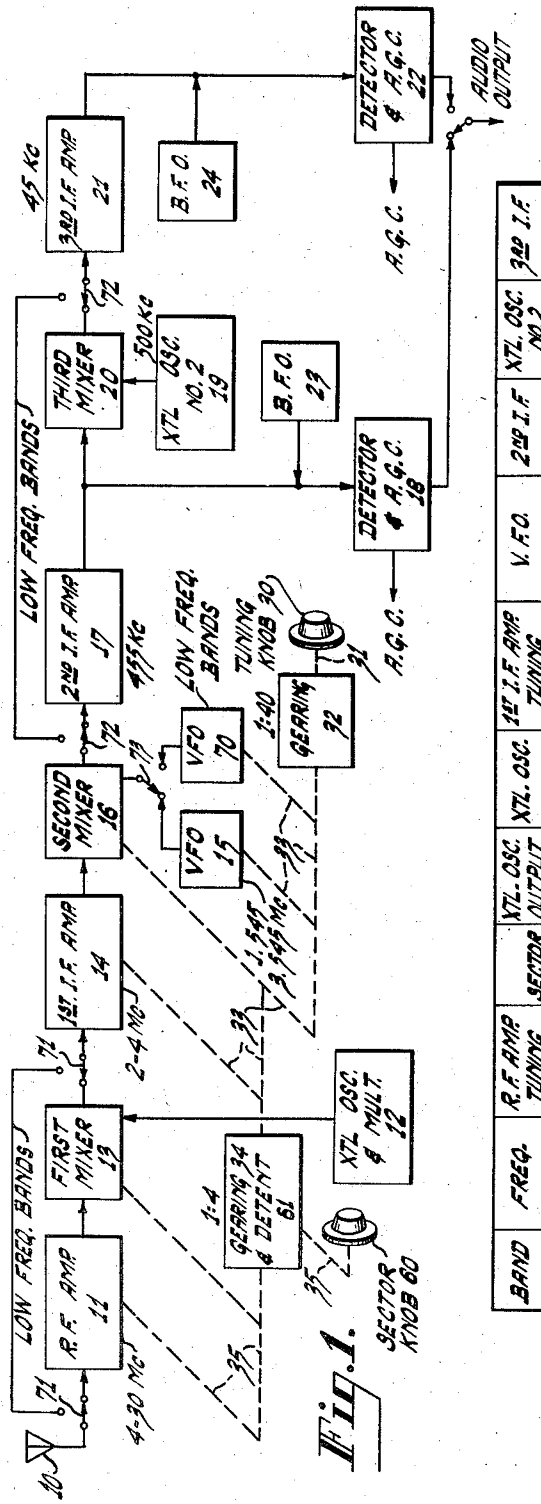

Fig. 1.

Fig. 2.

| BAND NO. | FREQ. RANGE | R.F. AMP TUNING RANGE | SECTOR | XTL. OSC. OUTPUT FREQ. | XTL. OSC. XTL. FREQ. | 1ST I.F. AMP TUNING RANGE | V.F.O. FREQ. | 2ND I.F. AMP. | XTL. OSC. NO. 2 FREQ. | 3RD I.F. AMP. |
|---|---|---|---|---|---|---|---|---|---|---|
| 1 | 4-6 Mc | 4-6 Mc | A | 7.09 Mc | 7.09 Mc | 3.09-1.09 Mc | 3.545-1.545 Mc | 455 Kc | 500 Kc | 45 Kc |
| 2 | 6-8 Mc | 6-8 Mc | B | 10 Mc | 10 Mc | 4.05-1.95 Mc | 3.545-1.545 Mc | 455 Kc | 500 Kc | 45 Kc |
| 3 | 8-10 Mc | 8-10 Mc | C | 12 Mc | 6 Mc | 4.05-1.95 Mc | 3.545-1.545 Mc | 455 Kc | 500 Kc | 45 Kc |
| 4 | 10-12 Mc | 10-12 Mc | D | 14 Mc | 7 Mc | 4.05-1.95 Mc | 3.545-1.545 Mc | 455 Kc | 500 Kc | 45 Kc |
| 5 | 12-14 Mc | 12-14 Mc | A | 16 Mc | 8 Mc | 4.05-1.95 Mc | 3.545-1.545 Mc | 455 Kc | 500 Kc | 45 Kc |
| 6 | 14-16 Mc | 14-16 Mc | B | 18 Mc | 6 Mc | 4.05-1.95 Mc | 3.545-1.545 Mc | 455 Kc | 500 Kc | 45 Kc |
| 7 | 16-18 Mc | 16-18 Mc | C | 20 Mc | 10 Mc | 4.05-1.95 Mc | 3.545-1.545 Mc | 455 Kc | 500 Kc | 45 Kc |
| 8 | 18-20 Mc | 18-20 Mc | D | 22 Mc | 11 Mc | 4.05-1.95 Mc | 3.545-1.545 Mc | 455 Kc | 500 Kc | 45 Kc |
| 9 | 20-22 Mc | 20-22 Mc | A | 24 Mc | 6 Mc | 4.05-1.95 Mc | 3.545-1.545 Mc | 455 Kc | 500 Kc | 45 Kc |
| 10 | 22-24 Mc | 22-24 Mc | B | 26 Mc | 13 Mc | 4.05-1.95 Mc | 3.545-1.545 Mc | 455 Kc | 500 Kc | 45 Kc |
| 11 | 24-28 Mc | 24-26 Mc | C | 28 Mc | 7 Mc | 4.05-1.95 Mc | 3.545-1.545 Mc | 455 Kc | 500 Kc | 45 Kc |
| 12 | 26-28 Mc | 26-28 Mc | D | 30 Mc | 10 Mc | 4.05-1.95 Mc | 3.545-1.545 Mc | 455 Kc | 500 Kc | 45 Kc |
| 13 | 28-30 Mc | 28-30 Mc | A | 32 Mc | 8 Mc | 4.05-1.95 Mc | 3.545-1.545 Mc | 455 Kc | 500 Kc | 45 Kc |

INVENTORS
RAYMOND G. BERGE &
GEORGE G. BRADLEY
BY
Charles H. Brown
ATTORNEY

INVENTORS
RAYMOND G. BERGE &
GEORGE G. BRADLEY
BY
Charles H. Brown
ATTORNEY

United States Patent Office 2,874,278

Patented Feb. 17, 1959

2,874,278

TUNING MECHANISM

Raymond G. Berge, Mineola, N. Y., and George G. Bradley, Sudbury, Mass., assignors to Radio Corporation of America, a corporation of Delaware Application October 23, 1956, Serial No. 617,721

4 Claims. (Cl. 250—20)

The invention relates to a tuning mechanism for a superheterodyne radio receiver, and particularly to a tuning mechanism for a multi-band superheterodyne radio receiver having tunable radio frequency and intermediate frequency amplifier circuits.

In conventional multi-band superheterodyne receivers, the received radio frequency signal is usually heterodyned with a signal generated by a local oscillator in such a manner that a constant frequency difference (known as the intermediate frequency) is maintained between the two signals. Such a receiver may be tuned by tuning the local oscillator and the radio frequency amplifier circuits, and this tuning is usually accomplished by means of suitable variable capacitors in the various circuits. These capacitors are usually coupled together or ganged so that they may be varied by means of a single control. A separate set of coils is generally required for each of the frequency bands covered by the receiver. One disadvantage of such a receiver is that its frequency stability is determined by the stability of the local oscillator and this stability decreases as the frequency to which the receiver is tuned increases. Another disadvantage is that the range of frequencies covered by the individual bands increases as the frequency is increased. And still another disadvantage is that a separate set of coils is required in the radio frequency amplifier circuit for each of the bands covered by the receiver.

Accordingly, an object of the invention is to provide a multi-band superheterodyne radio receiver having a frequency stability which is substantially constant for each of the bands.

Another object of the invention is to provide a superheterodyne radio receiver that covers a plurality of different bands, each of which covers a range of frequencies which is equal in width to those of the other bands.

Another object of the invention is to provide a multi-band superheterodyne radio receiver which requires fewer coils than the number of frequency bands over which the receiver operates.

Briefly, these and other objects may be accomplished in accordance with the invention by a tuning arrangement comprising a radio frequency amplifier that has a variable radio frequency capacitor having a plurality of selectable ranges, and an intermediate frequency amplifier that has a variable intermediate frequency capacitor. Tuning means are coupled to the intermediate frequency capacitor for varying the intermediate frequency capacitor. A coupling arrangement having input and output mechanisms is provided, and these input and output mechanisms are coupled together by a step-down mechanism which causes the output mechanism to vary in response to variations of the input mechanism by an amount that is less than the amount of the input variations. The input mechanism is coupled to the tuning means for the intermediate frequency capacitor, and the output mechanism is coupled to the radio frequency capacitor. Because of the step-down mechanism, the radio frequency capacitor will vary less than the intermediate frequency capacitor for a given variation of tuning. If the step-down mechanism and the selectable ranges are properly proportioned with respect to the intermediate frequency capacitor, the radio frequency capacitor will be varied thru one of its selectable ranges while the intermediate frequency capacitor is varied thru its entire range. When used in a multi-band radio receiver, this tuning arrangement permits such a receiver to have a frequency stability that is substantially constant for each of the bands, and to provide an equal range of frequencies for each of the bands. A further advantage of the invention is that fewer coils are required in the radio frequency amplifier than are required in conventional superheterodyne receivers having the same total number of bands.

The invention is explained in detail in connection with the accompanying drawing, in which:

Figure 1 shows a block diagram of superheterodyne radio receiver utilizing the invention;

Figure 2 shows a chart giving examples of frequencies utilized in a radio receiver such as shown in Figure 1.

Figure 3:
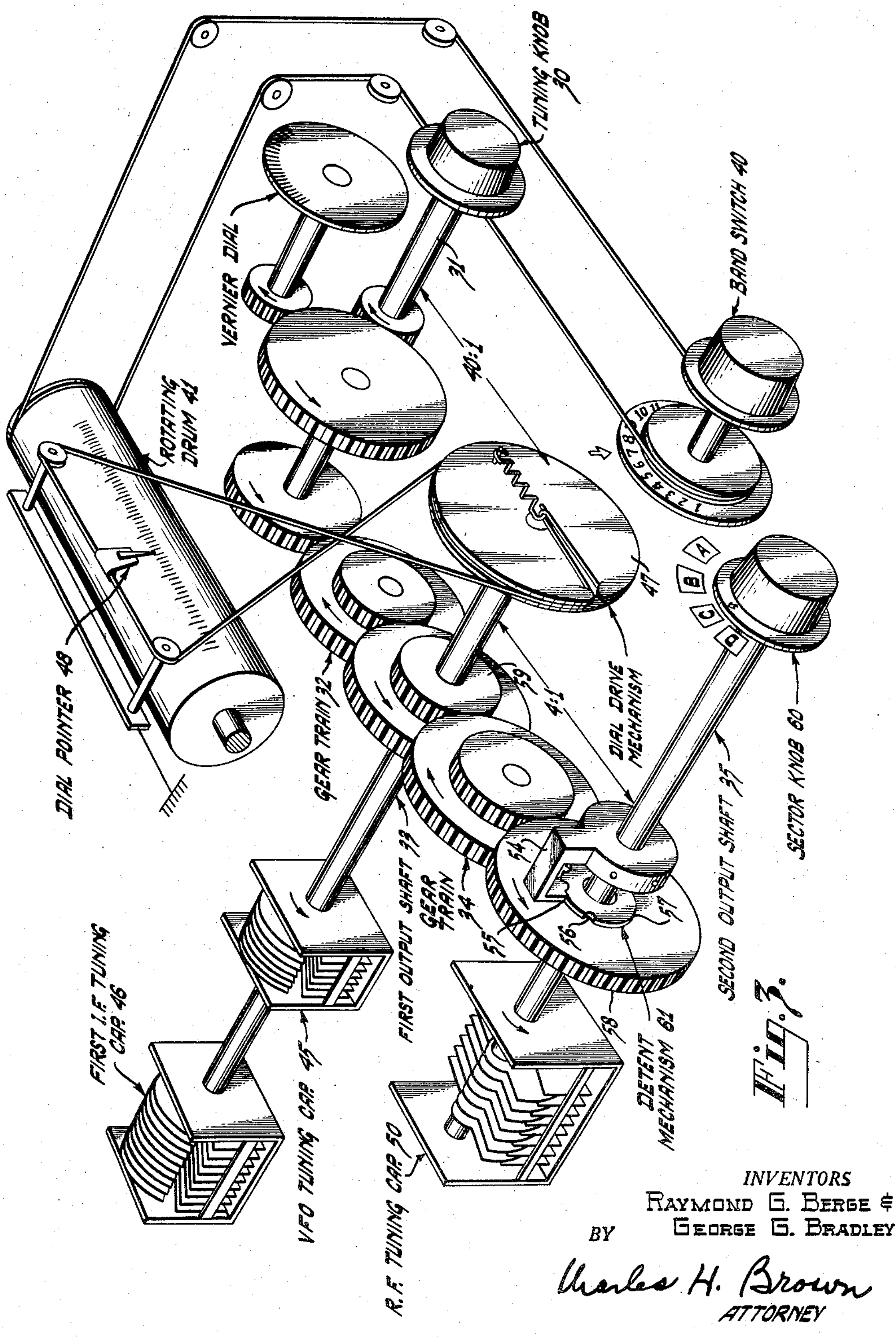
Figure 3 shows a perspective view of a tuning arrangement in accordance with the invention for use in a radio receiver such as shown in Figure 1.

Figure 1 shows a block diagram of a multi-band superheterodyne radio receiver utilizing the invention. For the purposes of description, it is assumed that the radio receiver shown in Figure 1 has an overall range of frequency tuning from 4 to 30 megacycles (mc.). However, the receiver may also receive low frequency signals (from 70 kilocycles to 4 megacycles) as will be explained later. As shown in the chart in Figure 2, this overall range is covered by thirteen bands each having a range of two megacycles. It is to be understood that more or fewer bands, each having an equally broad range or each having an equal but greater or smaller range, could be used. Radio frequency signals are received over an antenna 10, and are coupled to a radio frequency amplifier 11. This radio frequency amplifier 11 may have one or more stages of amplification, each of which has a variable capacitor which is tuned in a manner which will be subsequently described. After being amplified, the received signals are heterodyned with a signal produced by a stable, fixed frequency (preferably crystal-controlled), oscillator 12 in a conventional first mixer circuit 13. The frequency of the signal produced by the crystal-controlled oscillator 12 is selected so that the first intermediate frequency signals produced by the first mixer 13 have a frequency that always falls within the tuning range of a first intermediate frequency amplifier 14. In the example assumed, this frequency range is approximately 2 to 4 megacycles (mc.). This intermediate frequency amplifier 14 may have one or more stages of amplification, each of which has a variable capacitor which is tuned in a manner which will be subsequently described. The first intermediate frequency signals are amplified by the first intermediate frequency amplifier 14, and these amplified first intermediate frequency signals are heterodyned in a second conventional mixer circuit 16 with a signal produced by a variable frequency oscillator 15. The frequency of the signal produced by the variable frequency oscillator 15 is selected so that the second intermediate frequency signals produced by the second mixer 16 have a constant frequency. In the example assumed, and as shown in the chart in Figure 2, the second intermediate frequency is 455 kilocycles (kc.). The variable frequency oscillator 15 has a variable capacitor which is also tuned in a manner which will be subsequently described. The second intermediate frequency signals may be amplified in a second intermediate frequency amplifier 17, and then detected in a conventional detector and automatic gain control circuit 18 to produce audible signals. Or, the second intermediate frequency signals may be heterodyned in a conventional third mixer circuit 20 with a signal produced by a second crystal-controlled or other stable oscillator 19 to produce third intermediate frequency signals. The frequency of the signal produced by the second crystal-controlled oscillator 19 is selected so that the third intermediate frequency signals produced by the third mixer 20 have a constant frequency, which, in the example assumed, is 45 kilocycles (kc.). This third intermediate frequency signal may be amplified in a conventional third intermediate frequency amplifier 21, and then detected in a conventional detector and automatic gain control circuit 22 to produce audible signals. It may be desirable to utilize the third intermediate frequency when additional selectivity devices, such as a mechanical filter, are to be used in the radio receiver. Either intermediate frequency may be selected by a suitable switch connected to the audio circuit. Conventional beat frequency oscillator circuits 23, 24 may be provided to produce an audible beat note when continuous wave (C. W.) signals are being received.

As mentioned previously, it is assumed that the receiver has an overall range of frequency tuning from 4 to 30 megacycles, and that this overall range is covered by thirteen bands, each having a range of 2 megacycles. These frequencies are listed in the second column of the chart shown in Figure 2. However, it should be understood that the receiver can operate equally well over a different overall range of frequency tuning by using a different number of bands or by using bands having a different frequency range, or both. The tuning mechanism for the receiver comprises a tuning knob 30 coupled by means of a shaft 31 to a gearing mechanism or train 32 having a step-down ratio of 40 to 1, and to which a first output shaft 33 is coupled. It will be seen that if the tuning knob 30 is revolved forty times, the first output shaft 33 revolves once. Other step-down ratios can be used. The first output shaft 33 is coupled to the variable capacitor or capacitors in the first intermediate frequency amplifier 14 and to the variable capacitor in the variable frequency oscillator 15. The first output shaft 33 may also be coupled to the capacitor in the second mixer circuit 16 if the second mixer circuit 16 is tunable. The first output shaft 33 is also coupled to a gearing and detent mechanism 34 having a step-down ratio of 4 to 1, and to which a second output shaft 35 is coupled. It will be seen that if the first output shaft 33 is revolved four times, the second output shaft 35 revolves once. Other step-down ratios can be used. The second output shaft 35 is coupled to the variable capacitor or capacitors of the radio frequency amplifier 11, and is also coupled to the capacitor in the first mixer circuit 13 if the first mixer circuit 13 is tunable. The variable capacitor in the radio frequency amplifier 11 is divided into a plurality of sectors. Any number of sectors can be used. In the assumed example, it is divided into four sectors A, B, C, and D. Any one of these sectors is selectable by means of a sector knob 60 and its associated gearing and detent mechanism 61, and each of these sectors provides an equal range of frequency tuning, namely, 2 megacycles. Since each of the sectors provides a tuning range of 2 megacycles, and since the radio frequency tuning capacitor has four such sectors, each of the tuning coils associated with the radio frequency capacitor can be used for tuning over the four sectors, which is equivalent to a tuning range of four bands or 8 megacycles. This feature permits the use of fewer tuning coils than is required in conventional radio receivers. The various bands and their associated frequencies and sectors are given in the chart shown in Figure 2.

The crystal oscillator and multiplier 12 comprises a conventional crystal-controlled oscillator having seven crystals that have the fundamental frequencies of 6, 7, 7.09, 8, 10, 11, and 13 megacycles, respectively. A signal having the fundamental or a harmonic frequency of one of these crystal frequencies is mixed with the signals produced by the radio frequency amplifier 11 in the first mixer circuit 13 so that the resulting first intermediate frequency signals have a frequency that always lies within the range between 2 and 4 megacycles. These frequencies are shown in the chart in Figure 2. As an illustration of the frequencies, assume that band 7, covering the frequencies between 16 and 18 megacycles, is selected. Sector C of the radio frequency amplifier tuning capacitor will then be utilized. The crystal oscillator and multiplier 12 will then be using the crystal having a fundamental frequency of 10 megacycles, and will utilize the second harmonic of that crystal, namely 20 megacycles. The 20 megacycles signal will be heterodyned with the incoming signals having frequencies between 16 and 18 megacycles to produce the first intermediate frequency signals having a frequency range between 2 and 4 megacycles. Actually, this range covers from 1.95 to 4.05 megacycles so as to provide the bands with a small degree of overlap. Each of the bands, with the exception of band 1, have first intermediate frequency signals which fall within this range. The first intermediate frequency range for band 1 is between 1.09 and 3.09 megacycles, so that the first intermediate frequency amplifier 14 cannot be tuned to the frequency of the incoming signals, namely 4 megacycles.

Signals from the first intermediate frequency amplifier 14 are heterodyned with signals produced by the variable frequency oscillator 15 in the second mixer 16 in a conventional manner so as to produce second intermediate frequency signals having a frequency of 455 kilocycles. The variable frequency oscillator 15 tunes over the range between 1.545 and 3.545 megacycles, regardless of the frequency of the incoming signals. Because of this feature, the frequency stability of the receiver is determined by the frequency stability of the variable frequency oscillator 15. And since the tuning range of the variable frequency oscillator is fixed, the frequency stability does not decrease as the frequency of the incoming signals increases. Furthermore, it is possible to make the frequency stability of the variable frequency oscillator 15 more stable than would be possible with an oscillator which had to produce signals over a wider range of frequencies. The 455 kilocycles second intermediate frequency signals are amplified and heterodyned with a signal that is produced by the second crystal oscillator 19 and that has a fixed frequency of 500 kilocycles in a third mixer circuit 20 to produce third intermediate frequency signals having a frequency of 45 kilocycles. The frequencies for the various signals in the receiver are given in the chart shown in Figure 2.

A perspective view of a tuning arrangement in accordance with the invention is shown in Figure 3. This tuning arrangement comprises a band switch 40 which permits selection of one of the thirteen bands. This switch 40, as in conventional receivers, serves to couple appropriate components into the various other circuits, depending upon the frequency range to be covered. The band switch 40 is coupled to a rotating drum 41 which carries the frequency dials for the thirteen bands so that the appropriate frequency dial is presented to an operator as the band switch 40 is switched from band to band. The tuning knob 30 is coupled to the gear train 32 by the shaft 31. The rotation of the tuning knob 30 causes rotation of the shaft 31 and the gear trains 32, 34. The first output shaft 33 is coupled to the gear train 32 and also to the variable frequency oscillator tuning capacitor 45 and to the first intermediate frequency amplifier tuning capacitor 46. A dial driving mechanism, including a drum 47 and a pointer 48, is also coupled to the first output shaft 33 for moving the dial pointer 48 along the dial as the tuning knob 30 is rotated. A vernier dial may be coupled to the tuning knob 31 as shown. The gear train 32 has a step-down ratio of forty to one. For every forty revolutions of the tuning knob 30, the first output shaft 33 rotates once. As mentioned before, other step-down ratios can be used. The radio frequency amplifier tuning capacitor 50 is coupled to a second output shaft 35, and this shaft 35 is coupled to the first output shaft 33 thru a detent mechanism 61 and gear train 34. The detent mechanism 61 includes a detent arm 54 which is rigidly secured to the second output shaft 35, and the detent arm 54 has a follower 55 which may be spring-loaded and which is arranged so that it normally engages one of four notches 56 which are placed in the circumference of a detent plate 57. The four notches 56 are spaced about the detent plate 57 at a distance of 45 degrees apart. This angular spacing is determined by dividing the angular range (usually 180°) of the radio frequency amplifier capacitor 50 by the number of sectors (four in the example) that the radio frequency amplifier tuning capacitor 50 is to have. The detent plate 57 is rigidly fastened to an output gear 58 of the gear train 34. This output gear 58 is concentrically positioned about the second output shaft 35 so that it rotates freely about the shaft 35 without directly causing the shaft 35 to rotate. However, as will be seen in Figure 3, rotation of the output gear 58 causes the detent arm 54 and its follower 55 to rotate, and this rotation causes the second output shaft 35 and the radio frequency amplifier tuning capacitor 50 to rotate. The gear train 34 has an input gear 59 coupled to the first output shaft 33. The gear train 34 has a step-down ratio of four to one, so that when the first output shaft 33 rotates four times, the second output shaft 35 rotates once. This step-down ratio is determined by the number of sectors the radio frequency amplifier tuning capacitor 50 is to have. A sector knob 60 is coupled directly to the second output shaft 35, and when this sector knob 60 is rotated, the second output shaft 35 and the radio frequency amplifier tuning capacitor 50 are also rotated. As the sector knob 60 is rotated, the follower 55 of the detent mechanism 61 becomes disengaged from the notches 56 because of the relatively large inertia of the output gear 58 and its associated gear trains 32, 34 in the step-up ratio direction. However, when the gear trains 32, 34 are rotated, the follower 55 remains engaged in the notches 56 because of the relatively small inertia of the radio frequency tuning capacitor 50 and its shaft 35. Thus, the detent mechanism 61 permits the desired sector of the radio frequency amplifier tuning capacitor 50 to be selected without rotating the first output shaft 33, and still permit the radio frequency amplifier tuning capacitor 50, the first intermediate frequency amplifier tuning capacitor 46, and the variable frequency oscillator tuning capacitor 45 to be tuned simultaneously by the tuning knob 30.

The sectors of the radio frequency amplifier tuning capacitor 50 may be indicated by suitable markings having the same spacings as the notches 56 in the proper band position above the sector knob 60. Once a sector is selected by rotating the sector knob 60, the knob 60 then moves in that sector as the tuning knob 30 is rotated. Thus, the sector markings indicate a selected sector, and the arrow on the sector knob 60 remains in this selected sector throughout the entire rotation of the tuning knob 30. If there are four sectors and if the radio frequency tuning capacitor 50 rotates 180°, then each sector includes an angle of 45° through which the arrow on the sector knob 60 may rotate and still remain in the selected sector. The sector to be used for a particular band may be indicated in any suitable manner by an arrangement associated with the band switch 40. This arrangement migh also include an indicator light that turns on or off to indicate that the proper sector has been selected for the particular band being received.

While the various variable capacitors used in the receiver may be non-linear, it is preferable that they be linear with respect to frequency, i. e., provide a frequency change that is linear with respect to the angle of rotation of the capacitor. Such linear capacitors are preferred because the proper tracking between the various circuits is more easily obtained. Series or shunt padding capacitors or both may also be needed for some of the variable capacitors for some of the bands.

Since the frequency stability of the first intermediate frequency signals depend only upon the stability of the crystal oscillator and multiplier 12, it is apparent that the frequency stability of the first intermediate frequency signal is quite high. And since the variable frequency oscillator 15 operates only over a small range of low frequencies, namely from 1.545 to 3.545 megacycles, it will be apparent that the second intermediate frequency signals also have a high frequency stability. Thus the overall frequency stability of a receiver in accordance with the invention is higher than the stability obtained with a conventional superheterodyne receiver. The use of a tunable intermediate frequency amplifier that covers a fixed frequency range for all bands, namely from 1.09 to 3.09 or from 2 to 4 megacycles, results in a radio receiver which has an equal range of frequencies for each band over which the receiver is designed to operate. Thus, the same amount of band spread is obtained at the higher frequency end of the receiver, namely 30 megacycles, as is obtained at the lower end of the receiver, namely 4 megacycles. And finally, by the use of the gear train 34 and the detent mechanism 61, the radio frequency amplifier tuning capacitor 50 may be divided into a plurality of sectors, thus reducing the required number of tuning coils needed for the radio frequency amplifier tuning capacitor. In the example described, namely, a radio frequency amplifier tuning capacitor having four sectors, only one-fourth the usual number of tuning coils are needed because any one coil resonates with all four sectors of the radio frequency tuning capacitor.

As previously mentioned, the receiver is also capable of receiving signals of lower frequency, such as frequencies covering the range from 70 kilocycles to 4 megacycles. When the receiver is to receive these low frequency signals, the first intermediate frequency amplifier 14 serves as a radio frequency amplifier and signals from the antenna 10 are coupled directly to the first intermediate frequency amplifier 14 by means of a ganged switch 71. When the receiver is in this condition, the radio frequency amplifier 11 and the first mixer 13 are by-passed. Further, when the receiver is in this condition for receiving the low frequency signals, it is necessary that the first intermediate frequency amplifier 14 be able to tune in the low frequency signals. This may be accomplished by appropriate circuit elements in the first intermediate frequency amplifier. The signals amplified by the first intermediate frequency amplifier 14 (serving as a radio frequency amplifier) are applied to the second mixer 16 as previously described. However, since the variable frequency oscillator 15 has a fixed range of tuning, namely between 1.545 and 3.545 magacycles, a low frequency variable frequency oscillator 70 is provided for producing a heterodyning signal for the low frequency signals. The appropriate oscillator may be selected by the switch 73. Depending upon whether or not 455 kilocycles intermediate frequency signals are to be used or whether 45 kilocycles intermediate frequency signals only are to be used, the low frequency variable frequency oscillator 70 produces a signal having a frequency which is higher than the frequency of the incoming radio frequency signals by an amount equal to the desired intermediate frequency. For example, if 455 kilocycles intermediate frequency signals are to be used, the low frequency variable frequency oscillator 70 would then produce a signal having a frequency which is 455 kilocycles higher than the frequency of the incoming radio frequency signals. Or, if only 45 kilocycles intermediate frequency signals are to be used, the low frequency variable frequency oscillator 70 would then produce a signal having a frequency that is 45 kilocycles higher than the frequency of the incoming radio frequency signals. Also depending upon whether the 455 kilocycles intermediate frequency signals are to be used or whether only 45 kilocycles intermediate frequency signals are to be used, the intermediate frequency signals (produced by heterodyning the incoming radio frequency signals and the low frequency variable frequency oscillator signal in the second mixer) are applied either to the second intermediate frequency amplifier 17 or to the third intermediate frequency amplifier 21 by means of a ganged switch 72. If the 455 kilocycles intermediate frequency signals are to be used, the audio circuit may still be connected to either of the detectors 18, 22 and their respective intermediate frequency amplifiers 17, 21. These features provide additional flexibility for the receiver.

The invention claimed is:

1. A tuning arrangement for a radio receiver comprising a tunable radio frequency amplifier that has a rotatable, radio frequency, tuning capacitor having N selectable sectors, each of which provides substantially the same range of frequency tuning, where N is any integer greater than unity, a crystal-controlled oscillator having at least one selectable frequency, first mixing means coupled to said radio frequency amplifier and to said crystal controlled oscillator for deriving signals therefrom and producing a first intermediate frequency signal in response thereto, a tunable first intermediate frequency amplifier that has a rotatable, intermediate frequency, tuning capacitor having a capacity that provides a range of frequency tuning substantially equal to said range of frequency tuning provided by one of said sectors, means coupling said first intermediate frequency amplifier to said first mixing means, a variable frequency oscillator that has a rotatable tuning capacitor having a capacity that provides a range of frequency tuning substantially equal to said range of frequency tuning provided by one of said sectors, second mixing means coupled to said first intermediate frequency amplifier and to said variable frequency oscillator for deriving signals therefrom and providing an intermediate frequency signal in response thereto, a tuning mechanism coupled to said intermediate frequency capacitor and to said variable oscillator capacitor for rotating said intermediate frequency capacitor and said variable oscillator capacitor, a coupling arrangement having an input gear coupled to said tuning mechanism, an output gear coupled to said input gear so that said output gear rotates in response to rotations of said input gear thru an angle that is $$\frac{1}{N}$$

of the angle thru which said input gear rotates, a circular detent plate coupled to said output gear and having N notches spaced $$\frac{180°}{N}$$

apart on the circumference of said plate, a detent arm coupled to said radio frequency capacitor and having a follower arranged so that it normally engages one of said notches, and a selecting mechanism coupled to said detent arm for selecting one of said sectors, said follower becoming disengaged from said notches when said selecting mechanism is operated.

2. A tuning arrangement for a radio receiver as defined in claim 1 and having means coupled to said second mixing means for producing an audible signal in response to said second intermediate frequency signal produced by said second mixing means.

3. A tuning arrangement for a radio receiver as claimed in claim 1, wherein N is four and wherein said range of frequency tuning is substantially equal to two megacycles.

4. A radio receiver comprising signal input means, a tunable radio frequency amplifier having an input circuit, an output circuit, and a rotatable, radio frequency, tuning capacitor having N selectable sectors, each of said sectors providing substantially the same range of frequency tuning, where N is any integer greater than unity, a crystal-controlled oscillator having at least one selectable frequency, a first mixer coupled to said output circuit of said radio frequency amplifier and to said crystal-controlled oscillator for deriving signals therefrom and producing a first intermediate frequency signal in response thereto, a tunable first intermediate frequency amplifier that has an input circuit, an output circuit, and a rotatable, intermediate frequency, tuning capacitor having a capacity that provides a range of frequency tuning substantially equal to said range of frequency tuning provided by one of said sectors, first switching means for alternatively coupling said input circuit of said first intermediate frequency amplifier to said signal input means or for coupling said input circuit of said first intermediate frequency amplifier to said first mixer and for coupling said input circuit of said radio frequency amplifier to said signal input means, a variable frequency oscillator that has a rotatable tuning capacitor having a capacity that provides a range of frequency tuning substantially equal to said range of frequency tuning provided by one of said sectors, a second mixer coupled to said output circuit of said first intermediate frequency amplifier and to said variable frequency oscillator for deriving signals therefrom and producing an intermediate frequency signal in response thereto, a second intermediate frequency amplifier that has an input and an output circuit, a second crystal-controlled oscillator, a third mixer coupled to said output circuit of said second intermediate frequency amplifier and to said second crystal-controlled oscillator for deriving signals therefrom and producing an intermediate frequency signal in response thereto, a third intermediate frequency amplifier that has an input and an output circuit, second switching means for alternatively coupling said input circuit of said third intermediate frequency amplifier to said second mixer or for coupling said input circuit of said second intermediate frequency amplifier to said second mixer and for coupling said input circuit of said third intermediate frequency amplifier to said third mixer, a tuning mechanism coupled to said intermediate frequency capacitor and to said variable oscillator capacitor for rotating said intermediate frequency capacitor and said variable oscillator capacitor, a coupling arrangement having an input gear coupled to said tuning mechanism, an output gear coupled to said input gear so that said output gear rotates in response to rotations of said input gear thru an angle that is $$\frac{1}{N}$$

of the angle to which said input gear rotates, a circular detent plate coupled to said output gear and having N notches spaced $$\frac{180°}{N}$$

apart on the circumference of said plate, a detent arm coupled to said radio frequency capacitor and having a follower arranged so that it normally engages one of said notches, and a selecting mechanism coupled to said detent arm for selecting one of said sectors, said follower becoming disengaged from said notches when said selecting mechanism is operated.

References Cited in the file of this patent

UNITED STATES PATENTS

| | | |
|---|---|---|
| 2,505,754 | Combs | May 2, 1950 |
| 2,539,537 | Harley | Jan. 30, 1951 |
| 2,567,860 | Shapiro | Sept. 11, 1951 |